(12) United States Patent
Co et al.

(10) Patent No.: US 8,423,446 B2
(45) Date of Patent: *Apr. 16, 2013

(54) DERIVATIVE PRODUCTS

(75) Inventors: Richard Co, Chicago, IL (US); John Labuszewski, Westmont, IL (US); John Nyhoff, Darien, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,916

(22) Filed: Aug. 8, 2012

(65) Prior Publication Data

US 2012/0303510 A1 Nov. 29, 2012

Related U.S. Application Data

(63) Continuation-in-part of application No. 11/611,433, filed on Dec. 15, 2006, now Pat. No. 8,265,965, which is a continuation-in-part of application No. 11/537,441, filed on Sep. 29, 2006, now Pat. No. 8,266, 026.

(60) Provisional application No. 60/827,990, filed on Oct. 3, 2006.

(51) Int. Cl.
*G06Q 40/00* (2012.01)

(52) U.S. Cl.
USPC .............................. 705/36 R; 705/35; 705/37

(58) Field of Classification Search ............... 705/35–40
See application file for complete search history.

(56) References Cited

U.S. PATENT DOCUMENTS

| 6,304,858 | B1 | 10/2001 | Mosler et al. |
|---|---|---|---|
| 6,725,201 | B2 | 4/2004 | Joao |
| 2001/0027437 | A1 | 10/2001 | Turbeville et al. |
| 2002/0009964 | A1 | 1/2002 | Wolf et al. |
| 2002/0032586 | A1 | 3/2002 | Joao |
| 2002/0116288 | A1 | 8/2002 | Nakajima et al. |
| 2002/0147670 | A1 | 10/2002 | Lange |
| 2003/0014344 | A1 | 1/2003 | Chacko et al. |
| 2003/0023527 | A1 | 1/2003 | Wilce et al. |

(Continued)

OTHER PUBLICATIONS http://en.wikipedia.org/wiki/Basis_points; Basic Points, Wikipedia, Sep. 2006, retrieved from the Internet Sep. 21, 2006.

(Continued)

*Primary Examiner* — Jason M Borlinghaus
*Assistant Examiner* — Hao Fu
(74) *Attorney, Agent, or Firm* — Banner & Witcoff, Ltd.

(57) ABSTRACT

Methods, systems and apparatuses are described for processing and clearing derivatives products with a digital outcome and a plurality of constituents. A computer system configured to process and clear derivative products can accept initial and adjusted performance bonds from buyers and sellers, and adjust the market price of the derivative product at intervals. The market price may be adjusted on a mark-to-market basis and through analysis of other information, e.g., a change in credit rating of reference entities of the derivative product. As a result of price adjustments, cash flow may be generated between buyers and sellers (e.g., credit and debit to accounts). The derivative product may pay a percentage of a predetermined final settlement amount upon the triggering of a predetermined event in each of the constituents of the derivative product. However, upon expiration of the derivative product, the derivative's market price is settled to zero and the agreement is terminated.

20 Claims, 6 Drawing Sheets

U.S. PATENT DOCUMENTS

| | | |
|---|---|---|
| 2003/0023528 A1 | 1/2003 | Wilce et al. |
| 2003/0023539 A1 | 1/2003 | Wilce et al. |
| 2003/0093347 A1 | 5/2003 | Gray |
| 2003/0115128 A1 | 6/2003 | Lange et al. |
| 2003/0120568 A1 | 6/2003 | Chacko et al. |
| 2003/0224854 A1 | 12/2003 | Joao |
| 2003/0236738 A1 | 12/2003 | Lange et al. |
| 2004/0024692 A1 | 2/2004 | Turbeville et al. |
| 2004/0030638 A1 | 2/2004 | Dwin |
| 2004/0039972 A1 | 2/2004 | Chung |
| 2004/0083116 A1 | 4/2004 | Joyce |
| 2004/0111355 A1 | 6/2004 | Hirani |
| 2004/0111358 A1 | 6/2004 | Lange et al. |
| 2004/0117288 A1 | 6/2004 | Marshall |
| 2004/0143528 A1 | 7/2004 | Spieler et al. |
| 2004/0143535 A1 | 7/2004 | Hirani |
| 2004/0162862 A1 | 8/2004 | Hull |
| 2004/0172304 A1 | 9/2004 | Joao |
| 2004/0225598 A1 | 11/2004 | Goldberg et al. |
| 2004/0230519 A1 | 11/2004 | Parker |
| 2004/0267660 A1 | 12/2004 | Greenwood et al. |
| 2005/0010481 A1 | 1/2005 | Lutnick et al. |
| 2005/0044034 A1 | 2/2005 | Perry et al. |
| 2005/0080703 A1 | 4/2005 | Chiesa et al. |
| 2005/0080734 A1 * | 4/2005 | Lynch et al. ............... 705/40 |
| 2005/0086156 A1 | 4/2005 | Conroy et al. |
| 2005/0108128 A1 | 5/2005 | Kastel |
| 2005/0108145 A1 * | 5/2005 | Kastel et al. ............... 705/37 |
| 2005/0144104 A1 | 6/2005 | Kastel |
| 2005/0149428 A1 | 7/2005 | Gooch |
| 2005/0197934 A1 | 9/2005 | Finkelstein et al. |
| 2005/0197937 A1 | 9/2005 | Fanous et al. |
| 2005/0216384 A1 | 9/2005 | Partlow et al. |
| 2005/0234792 A1 | 10/2005 | Gagnon et al. |
| 2006/0010056 A1 | 1/2006 | De La Motte |
| 2006/0036534 A1 | 2/2006 | Hirani |
| 2006/0036535 A1 | 2/2006 | Hirani |
| 2006/0059065 A1 | 3/2006 | Glinberg et al. |
| 2006/0059067 A1 | 3/2006 | Glinberg et al. |
| 2006/0143099 A1 | 6/2006 | Partlow et al. |
| 2006/0155638 A1 | 7/2006 | De La Motte |
| 2006/0253355 A1 | 11/2006 | Shalen |
| 2006/0253359 A1 | 11/2006 | O'Callahan |
| 2006/0253368 A1 | 11/2006 | O'Callahan et al. |
| 2006/0282355 A1 | 12/2006 | Canezin et al. |
| 2007/0294158 A1 * | 12/2007 | Patel et al. ............... 705/36 R |
| 2008/0010221 A1 | 1/2008 | Co et al. |
| 2008/0052223 A1 | 2/2008 | Johnson et al. |
| 2008/0082441 A1 | 4/2008 | Johnson et al. |
| 2008/0086408 A1 | 4/2008 | Johnson et al. |
| 2008/0091584 A1 | 4/2008 | Johnson et al. |
| 2009/0089200 A1 | 4/2009 | Stephen et al. |

OTHER PUBLICATIONS http://en.wikipedia.org/wiki/Credit_default>swap; Credit default swap, Wikipedia, Sep. 2006, retrieved from the Internet Sep. 21, 2006.

http://en.wikipedia.org/wiki/Credit_Default_Swap_index; Credit Default Swap Index, Wikipedia, retrieved from the Internet Sep. 21, 2006.

http://en.wikipedia.org/wiki/Derivative_%28finance%29; Derivative (finance), Wikipedia, retrieved from the Internet Sep. 21, 2006.

http://en.wikipedia.org/wiki/Default_%28finance%29; Default (finance), Wikipedia, retrieved from the Internet Sep. 21, 2006.

http://en.wikipedia.org/wiki/Hedge_%28finance%29; Hedge (finance), Wikipedia, retrieved from the Internet Sep. 21, 2006.

http://en.wikipedia.org/wiki/London_Interbank_Offered_Rate; London Interbank Offered Rate, Wikipedia, retrieved from the Internet Sep. 21, 2006.

http://en.wikipedia.org/wiki/Swap_%28finance%29; Swap (finance), Wikipedia, retrieved from the Internet Sep. 21, 2006.

IMF Working Paper; "Market-Based Estimation of Default Probabilities and Its Application to Financial Market Surveillance", Jorge A. Chan-Lau, Apr. 2006, WP/06/104, International Monetary Fund.

TSF, Tavakoli Structured Finance, Inc., Introduction to Credit Derivatives Credit Default Swaps, Janet Tavakoli, www.tavakolistructuredfiance.com, Copyright 2001.

PCT International Preliminary Report on Patentability, PCT/US2007/079398, mailed Apr. 9, 2009, 7 pages.

Hull, J. And White, A., Valuing Credit Default Swaps 1: No Counterparty Default Risk (online) presented Apr. 2000 (retrieved Jan. 7, 2008, Retrieved from internet: URL: http://www.rotman.utoronto.cal/~hull/ DownloadablePublications/CredDefSw1.pdf>, p. 3, par 2-p[g4, para2: p. 13, para 1—p. 14, para 2.

PCT International Search Report, International Application No. PCT/US07/79398, filed Sep. 25, 2007, mailed Mar. 13, 2008, 10 pages.

PCT International Search Report, International Application No. PCT/US07/79402, filed Sep. 25, 2007, mailed Mar. 13, 2008, 12 pages.

European Search Report, PCT/US2007079398, dated Aug. 25, 2011, 6 pages.

PCT International Preliminary Report on Patentability, PCT/US2007/079402, mailed Apr. 9, 2009, 8 pages.

Office Action in EP07843131.9 dated Sep. 6, 2012.

Communication with Supplementary European Search Report for EP07843135 dated Aug. 19, 2011.

Office Action in EP07843135 dated Sep. 6, 2011.

\* cited by examiner

| Date | Action | Market Price | Cash Flows |
|---|---|---|---|
| 6/19/06 | Buy one XYZ credit derivative | 200.0 bps | Posts $800 initial margin |
| 6/20/06 | | 198.0 bps | MTM pay of $20 |
| 6/21/06 | | 197.0 bps | MTM pay of $10 |
| 6/22/06 | | 200.5 bps | MTM collect of $35 |
| 6/23/06 | | 203.0 bps | MTM collect of $25 |
| ... | ... | ... | ... |
| 6/8/10 | | 2.0 bps | Accumulated pays of $1,980 |
| 6/9/10 | | 1.0 bps | MTM pay of $10 |
| 6/10/10 | | 0.5 bps | MTM pay of $5 |
| 6/11/10 | | 0.5 bps | |
| 6/14/10 | final cash settlement | 0.0 bps | MTM pay of $5 |
| | | | TOTAL PAYS = $2,000 |

Figure 3

| Date | Action | Market Price | Cash Flows |
|---|---|---|---|
| 6/19/06 | Buy one XYZ credit derivative | 200.0 bps | Posts $800 initial margin |
| 6/20/06 | | 198.0 bps | MTM pay of $20 |
| 6/21/06 | | 197.0 bps | MTM pay of $10 |
| 6/22/06 | | 200.5 bps | MTM collect of $35 |
| 6/23/06 | | 203.0 bps | MTM collect of $25 |
| ... | ... | ... | ... |
| 4/14/08 | credit concerns mounting | 321.0 bps | Accumulated collects of $1,210 |
| 4/15/08 | | 325.0 bps | MTM collect of $40 |
| 4/16/08 | clearinghouse increases margin requirement to $1,800 from $1,200 | 338.0 bps | MTM collect of $130 Post $600 in additional margins |
| 4/17/08 | | 339.0 bps | MTM collect of $10 |
| ... | | | |
| 8/5/08 | | 1,050.0 bps | Accumulated collects of $8,500 |
| 9/11/08 | fifty credit events declared | 1,500.0 bps | MTM collect of $4,300 |
| 9/12/08 | | 1,900.0 bps | MTM collect of $4,000 |
| 9/13/08 | | 1,950.0 bps | MTM collect of $500 |
| ... | | 2,490.0 bps | |
| 6/19/11 | final cash settlement | 2,500.0 bps | |
| | | | TOTAL COLLECTS = $23,000 |

DERIVATIVE PRODUCTS

This application is a continuation-in-part of U.S. Non-Provisional patent application Ser. No. 11/611,433 (now U.S. Pat. No. 8,265,965), filed Dec. 15, 2006, and incorporated by reference herein. Application Ser. No. 11/611,433 is a continuation-in-part of U.S. Non-Provisional patent application Ser. No. 11/537,441 (now U.S. Pat. No. 8,266,026), filed Sep. 29, 2006. Application Ser. No. 11/611,433 also claimed priority based on U.S. Provisional Patent Application No. 60/827,990, filed Oct. 3, 2006, and incorporated by reference herein.

FIELD OF THE INVENTION

The present invention relates to financial instruments. In particular, aspects of the invention relate to methods, systems, and apparatuses for the processing and clearing of derivatives.

DESCRIPTION OF THE RELATED ART

Credit derivatives are one of the fastest growing segments of the over-the-counter (OTC) derivatives market. Introduced in the mid to late 1990s, the outstanding notional value of credit default swaps (CDSs) has grown to approximately $26 trillion by mid 2006. Credit default swaps are one of the most frequently used type of credit derivatives.

In addition, indexes are one of the fastest growing segments of the derivatives market. Indexes include credit indexes that relate to credit derivatives tied to a bundle of corporate credit ratings. One credit index is the Dow Jones CDX North American Investment Grade Index (DJ CDX.NA.IG). The Dow Jones CDX.NA.IG represents a bundle of 125 corporate named entities reconstituted on a semi-annual basis. Each of the constituents of the Dow Jones CDX.NA.IG is associated with a reference obligation and a credit rating score (e.g., A, BBB, etc.). In addition, each of the constituents is assigned an individual weight (e.g., each of the 125 constituents is assigned a weight of 0.800 percent.)

In addition, a credit default swap is known and often used as an insurance policy for the holder of a reference obligation (e.g., a corporate bond or other debt obligations of a reference entity). A credit default swap is an agreement between a protection buyer and a protection seller designed to transfer the credit exposure of fixed income products (e.g., debt instruments, etc.) The terms of the agreement require the protection buyer to pay a periodic fee in return for a contingent payment by the protection seller upon a credit event (e.g., bankruptcy, etc.). In addition, many CDSs require the protection buyer to pay the entire fee upfront. This is particularly true in the case of short dated structures. The terms of a typical CDS include information about a reference entity, effective date, termination date, triggering credit events, restructuring clause, basis points, notional amount, and etc. The nature of a CDS is such that each agreement between a protection buyer and protection seller is customized for the particular deal. As a result, creating and processing CDSs can be time-consuming, inefficient, and cumbersome.

Therefore, there exists a need for systems and methods for more conveniently processing and clearing derivatives, including indexes with constituents, having a final settlement based on a triggering event.

SUMMARY OF THE INVENTION

Systems and methods are described for more conveniently processing and clearing derivative products with a plurality of outcomes (e.g., digital outcomes) and comprising a predetermined number of constituents. Each constituent may correspond to a different entity; thus, the derivative product may correspond to a plurality of obligations (e.g., bank loans, bonds, other borrowed monies, etc.) of the entity. A processing system, such as an electronic computing system, that may be configured to process and clear derivative products may receive a performance bond (or margin) deposit from a protection buyer and protection seller of a derivative product. Subsequently, positions for both buyer and seller may be periodically updated to "mark-to-market" (MTM), and pay any losses or collect any profits with respect to the current market price of the derivative on an interval, e.g., daily basis. The derivative product may call for a final settlement with a digital outcome, i.e., the final settlement price will be established as a percentage of the total final settlement price, or at zero, contingent upon the occurrence of triggering event in each of the constituents of the derivative product. The computer system may update the price of the derivative product at an interval (e.g., daily, periodically, etc.), at a predetermined date or time, or in response to an occurrence of an event. Cash flow is generated between a protection buyer and a protection seller to reflect the change in the market price of the derivative, i.e., the mark-to-market process. If a predetermined triggering event occurs before an expiration date of the derivative, then derivative may settle at a final price determined through the mark-to-market process. The protection seller may realize a predetermined amount of gain or loss at termination. The derivative product terminates at the earlier of: the expiration date, or the occurrence of a triggering event for all the constituents.

In another embodiment in accordance with aspects of the invention, a damage recovery rate of a derivative product may determine the final settlement of the derivative based on a predetermined fixed percentage or amount, such as 60% of the notional value, or based on other rules/criteria. For example, the early final settlement of a derivative agreement may be applied at a variable amount that is calculated using a predetermined formula.

Of course, the methods and systems of the above-referenced embodiments may also include other additional elements, steps, computer-executable instructions, or computer-readable data structures. In this regard, other embodiments are disclosed and claimed herein as well. In other embodiments, the present invention can be partially or wholly implemented on a computer-readable medium, for example, by storing computer-executable instructions or modules, or by utilizing computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Figure 1:
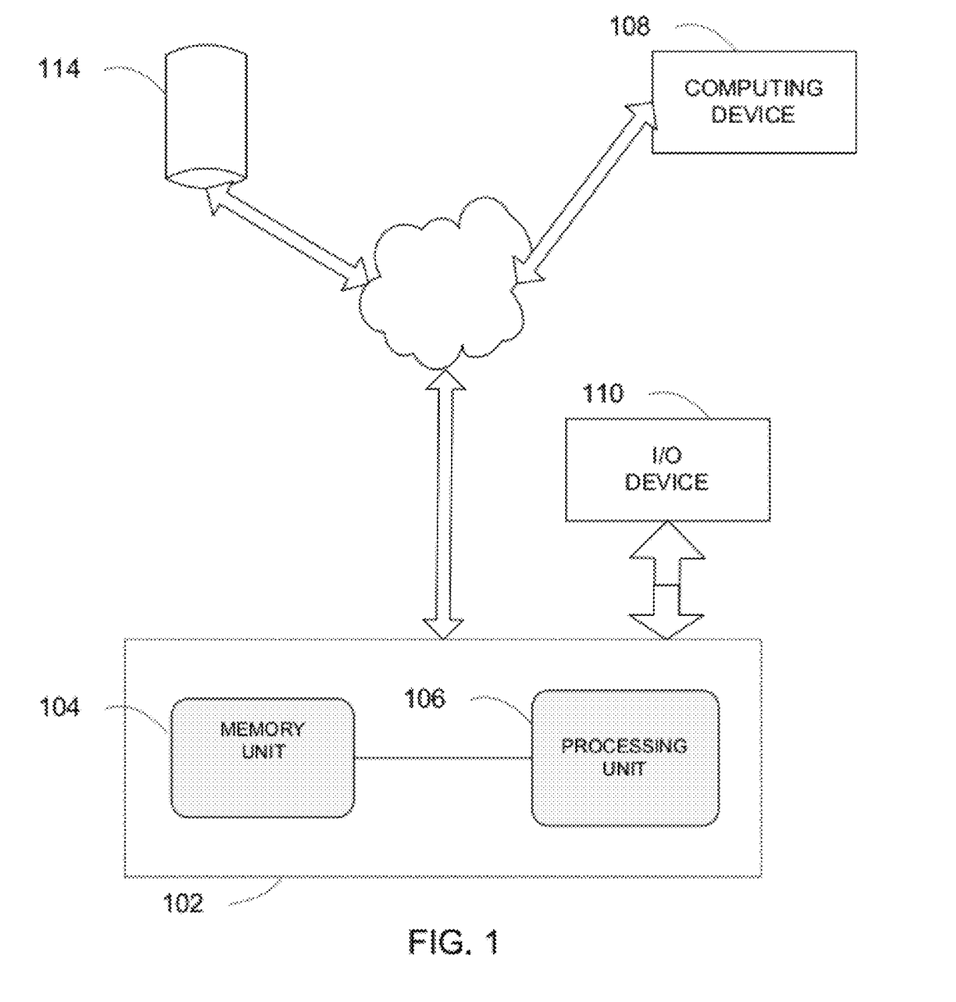
FIG. 1 illustrates a computer network system that may be used to implement aspects of the invention.

An example of a suitable operating environment in which various aspects of the invention may be implemented is shown in FIG. 1. The operating environment is only one example of a suitable operating environment and is not intended to suggest any limitation as to the scope of use or functionality of the invention. The processing unit 106 of computer system 102 executes computer-executable instructions in accordance with aspects of the invention. Memory unit 104 may store computer-executable instructions, which are executed by the computer system 102. The computer-executable instructions may be comprised of modules in accordance with aspects of the invention.

The computer system 102 may have one or more input/output devices 110 (e.g., keyboard, mouse, voice automation, screen, kiosk, handheld computing device display, voice, etc.). Database 114 may be a third-party database containing, for example, credit rating information or other information useful in determining the risk associated with a debt instrument. The database 114 may be connected through wired or wireless communication networks to the computer system 102. Computing device 108 may be a laptop computer, handheld computing device, or any other mobile computing device. In one embodiment in accordance with the invention, a user of computing device 108 can remotely communicate via the Internet to computer system 102 at a clearinghouse or exchange. The user may remotely enter orders for agreements offered by the exchange and indicate a bank account to pay margin requirements and receive cash flows from swaps.

Of course, numerous additional servers, computers, handheld devices, personal digital assistants, telephones and other devices may also be connected to exchange computer system 102. Moreover, one skilled in the art will appreciate that the topology shown in FIG. 1 is merely an example and that the components shown in FIG. 1 may be connected by numerous alternative topologies.

Figure 2:
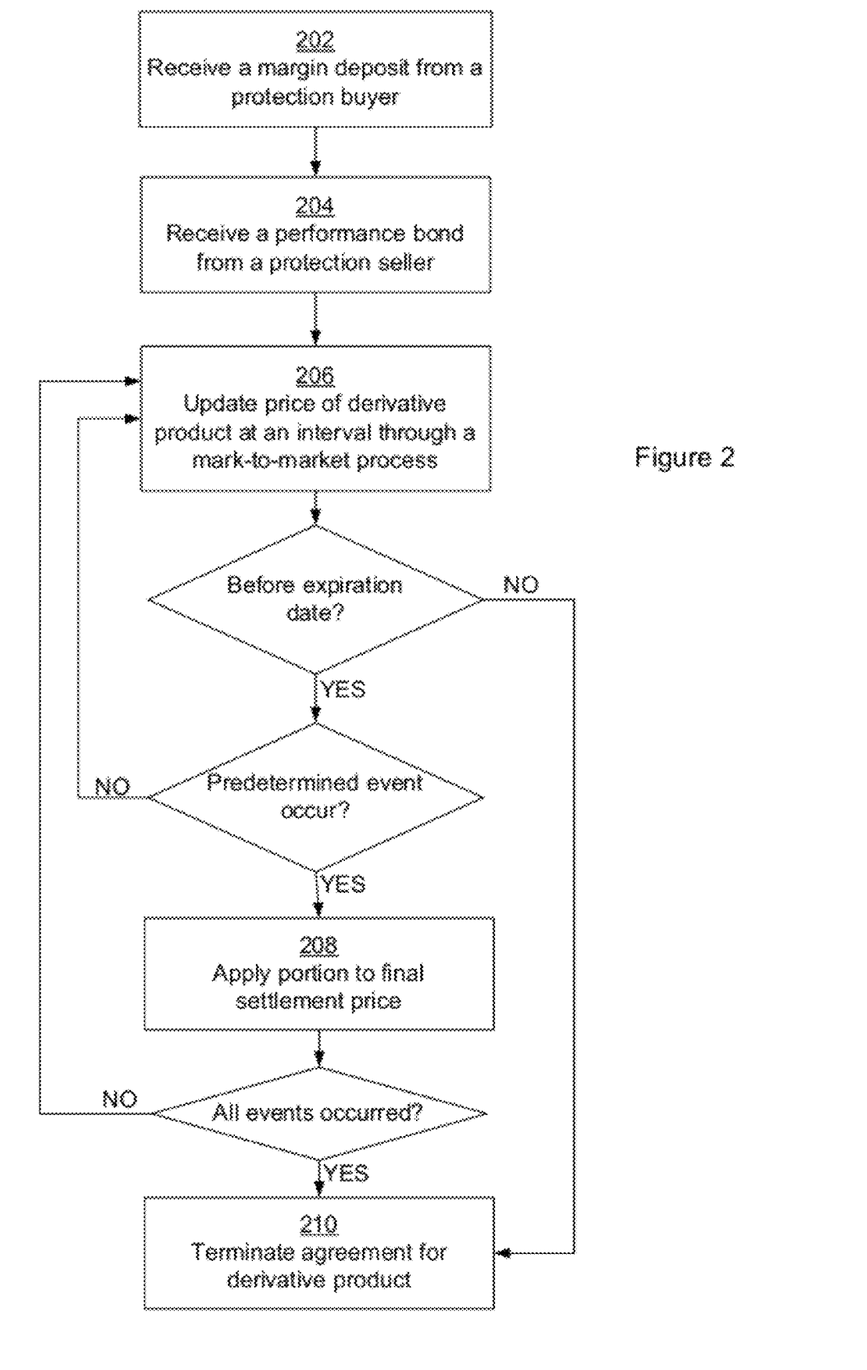
FIG. 2 illustrates a flowchart for an illustrative method for processing and clearing credit derivatives in accordance with aspects of the invention.

Referring to FIG. 2, in accordance with aspects of the invention, an illustrative method is depicted for processing and clearing derivatives having a final settlement based on the occurrence of potentially a plurality of triggering events. The method illustrated in FIG. 2 may be implemented in a computer system 102 configured to process and/or clear derivatives. The computer system may be a system located at or in communication with a clearinghouse or similar entity, such as the Chicago Mercantile Exchange (CME), Europe's EUREX clearinghouse, London clearinghouse (LCH) (e.g., LIFFE or Euronext.liffe), and Chicago Board of Trade (CBOT).

Derivatives may be offered and/or formed under a variety of agreements. Examples of derivatives include over-the-counter ("OTC") derivatives and exchange traded derivatives. In accordance with aspects of the invention, the agreement for a derivative discussed in the claimed invention may be an agreement for a type of exchanged traded credit derivative, such as a fixed recovery credit default swap ("CDS"). The CDS market may be divided into three sectors: (i) corporate bonds and loans; (ii) bank credits; and (iii) emerging market sovereigns. A CDS may reference a single credit (e.g., a single bond or single loan) or a basket/portfolio of credits. The CDS may reference a custom portfolio of credits agreed upon by the buyer and seller, or an index. The credits referenced in a CDS are known as the "reference entities." Reference entities may be defined to broadly include not only the immediate entity, but to also include successor entities. In addition, the agreement for the credit derivative may be based on a single reference entity. In other embodiments, the agreement for the credit derivative product may correspond to a credit index. For example, the derivative product may dovetail with the OTC market by referencing the same or substantially the same 125 reference entities or corporate names in a known index such as the Dow Jones CDX.NA.IG index, Markit Group Limited's iTraxx Europe Series 6 index, Markit Group Limited's CMBX.NA.AA.2 index, Markit Group Limited's iTraxx Australia Series 6 index, or some other bundle or group of reference entities. In another example, the derivative product may reference the occurrence (or non-occurrence) of a plurality of non-credit events, such as weather events, Federal Reserve interest rate changes, etc. The derivative product may be launched on an annual, semi-annual, quarterly, monthly, semi-monthly, weekly or some other periodic basis with original terms, or any other time period (e.g., a contract with a 5-year duration may be launched at 3-month intervals). The derivative product may reference any number of constituents, may be based on a single index, a combination of indexes, or any other criteria for selecting the constituents. Aspects of the invention are not limited in any way by any of the aforementioned indices; rather, the aforementioned indices are merely some examples of indices that may be used in accordance with aspects of the invention.

In accordance with aspects of the invention, a clearinghouse may act as a guarantor of the agreement for the derivative. At least one benefit of an exchange traded derivative, as opposed to the OTC type, is that the derivative is cleared and guaranteed by the clearinghouse. This may promise more interesting capital efficiencies for institutions that may cross-margin one derivative against another derivative. The agreements for the CDSs processed and cleared through a clearinghouse may include, but are not limited to, an expiration date, credit events, price, and/or notional amount.

For example, a user may submit and the computer system 102 may receive (in step 202) a margin deposit of the protection buyer for a particular credit derivative. The protection buyer may be the holder of a debt instrument desiring protection from the risk of default or other triggering events. A credit derivative may be used to enable the debt holder to alleviate the risk of default from the debt instrument. The protection buyer may be the issuer of the debt (e.g., a bank, hedge fund, venture capitalist, angel investor, etc.) or any person and/or entity interested in obtaining protection from the risk of an occurrence of a credit event. In other examples the protection buyer may be any person and/or entity interested in obtaining protection from the risk of an occurrence of a non-credit event, such as a weather event, interest rate event, or other events.

Furthermore, a user may submit and the computer system 102 may receive (in step 204) a performance bond of the protection seller of the credit derivative. A protection seller may sell (e.g., sell short) a XYZ credit derivative. The computer system 102 may require the protection seller to post an initial performance bond. In some embodiments, the protection seller may be required to post the same amount as the protection buyer (i.e., $800). In other embodiments, the margin amount may be different. In yet other embodiments, no margin amount may be required for special buyers and/or sellers with strong credit, long-standing relationship, or sufficient cash reserves.

For example, while a price of 200 basis points for a derivative product represents $2,000 (i.e., 2.00% times $100,000 notional value), the protection buyer may not be required to pay the entire $2,000 upfront in cash. Rather a clearinghouse that is processing and clearing the credit derivative transactions may require only an initial performance bond (e.g., margin deposit). In this example, the clearinghouse may require the protection buyer to post $800 in an initial performance bond when it receives the protection buyer's request. Likewise, a protection seller may submit an initial performance bond if it is determined that one is required.

Figure 3:
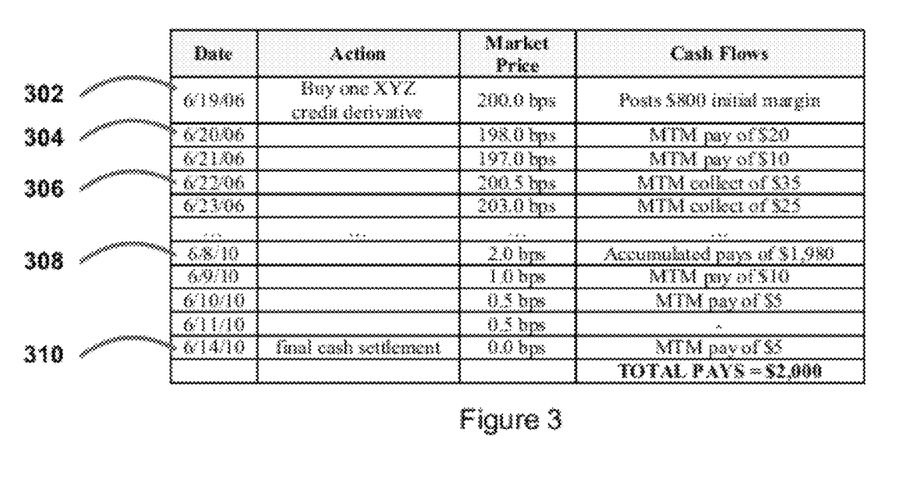
FIG. 3 and FIG. 4 show a series of actions, price updates, and cash flows of a credit derivative in accordance with various aspects of the invention.

Referring to FIG. 3, a protection buyer may purchase one XYZ credit derivative on June $19^{th}$ at a market price of 200 basis points (see entry 302). Assume for purposes of this example that the XYZ credit derivative has a 4-year term expiring (i.e., maturing) on Jun. 14, 2010 and based upon a notional value of $100,000. Also assume that the XYZ credit derivative is a credit index event future corresponding to a credit index, such as for example the latest reconstituted (or earlier constituted) series of the Dow Jones CDX.NA.IG index. For each of the constituents in the XYZ credit derivative that experience a predetermined triggering event before an expiration date, a portion (e.g., percentage) of the final settlement price may be applied (in step 208) to the agreement. The process of determining and applying a portion of the final settlement price (in step 208) is described in greater detail below.

Around the time when the portion is applied to the final settlement price, the clearinghouse may provide or publish notice of the occurrence of the triggering event. Consequently, a subsequent mark-to-market (MTM) process may consider these occurrences and cause an update (in step 206) in the reflected market price of the credit derivative product. Although the market price of credit derivatives may be variable and changed in accordance with market forces on a continuous basis, the clearinghouse may measure and record the prices on a regular basis for risk management and the MTM process. For example, a computer system 102 may be configured to update (in step 206) the market price of the credit derivative. The market price may be updated at a regular interval, at a predetermined time period, on specified dates or times, or any other now known or later developed convention for updating a market price. Assuming that all of the entities indexed by the XYZ derivative product are stable throughout the next four years until the expiration (i.e., maturity) date, the market price of the credit derivative may be marked-to-market at zero at the expiration date. For example, a protection buyer may enter into an agreement for a credit derivative (as indicated by entry 302) for a market price of 200 basis points. The next day (i.e., June $20^{th}$) the market price of the credit derivative may be adjusted on a mark-to-market basis to 198 basis points (see entry 304). At least one reason for the decrease in the market price of the credit derivative is because as the maturity date approaches, the amount of time remaining during which a triggering credit event (e.g., bankruptcy) may occur is reduced. In other words, the price of the credit derivative may be based, at least in part, on the total remaining time of the credit derivative. Thus, the market price of the credit derivative may be adjusted to reflect the change in risk exposure.

In addition, the market price of the credit derivative may be adjusted, in accordance with market forces, to reflect changes in the perception of credit risk related to the reference debts corresponding to the index of the derivative product. For example, if a reference entity (e.g., ABC Corporation of the index corresponding to the XYZ credit derivative product) is demoted in credit rating from a Standard & Poor's (S&P) credit rating of AAA (i.e., prime investment grade debt) to a S&P credit rating of BB (i.e., speculative non-investment grade debt), the credit risk related to the debt is increased. Ratings agencies such as Moody's, S&P, and Fitch provide credit ratings for corporate names. A credit rating of BBB− or higher is considered investment grade debt. Meanwhile, a corporate debt rated BB+ or lower is considered to be non-investment grade debt (e.g., high yield bonds, junk bonds, etc.) A corporate debt's rating may be used to establish a credit spread for the relative default or non-payment risk associated with a corporate debt instrument. In one embodiment, credit spreads are a function of credit rating and yield to maturity. A credit spread may be aggregated with the yield on a comparable maturity Treasury security yield to determine the credit-adjusted corporate bond yield. Higher corporate bond credit ratings imply smaller credit spreads. Therefore, ABC Corporation being demoted in credit rating near June $22^{nd}$ (see entry 306) may increase the market price of the XYZ credit derivative. For example, the price of the credit derivative may increase to 200.5 basis points. The final settlement price of a credit derivative may be commensurate with the risk associated with the triggering event (e.g., default, bankruptcy, etc.). The probability that ABC Corporation will default is highly correlated to that company's credit rating and is reflected in the updated market price of the XYZ credit derivative product.

Figure 4:
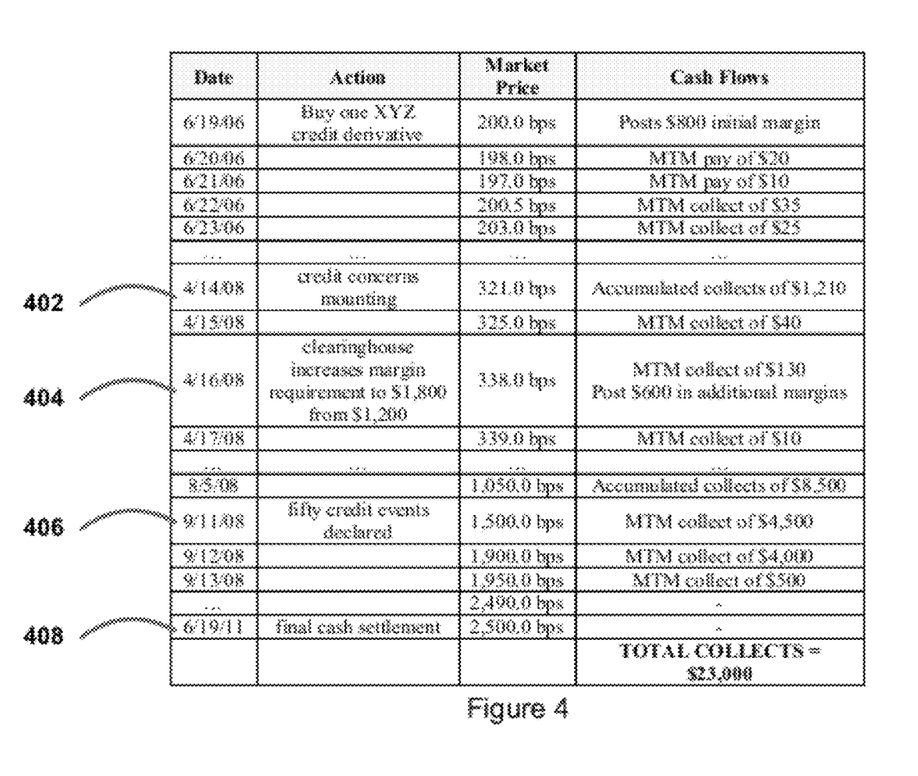

Referring to FIG. 4, as credit concerns relating to an entity (e.g., ABC Corporation) rise, the market price of the associated XYZ credit derivative product increases to 321 basis points (see entry 402). The market price increases to reflect the increased probability of a credit event corresponding to one or more constituent entities (i.e., ABC Corporation). Up to this point in time, the protection buyer has collected $1,210 from the protection seller (see entry 402). Commensurate with the increased volatility, the margin requirements may also be increased. For example, the clearinghouse may increase margin requirements from $1,200 to $1,800 (see entry 404). In one example, the buyer and/or seller may be required to post (in step 604) an adjusted performance bond for the derivative product.

In accordance with aspects of the invention, step 206 includes transferring cash flow between the protection buyer and the protection seller based on the price changes of the credit derivative. In the example embodied in FIG. 3, the update in the market price results in the computer system applying $35 from the protection buyer's account to the protection seller's account. A clearinghouse may use a computer system 102 to process and clear the current value of the credit derivative. For example, on Jun. 8, 2010 (see entry 308) the protection buyer may have paid a total of $1,980 of the fee towards the credit derivative. However, it isn't until the expiration date (i.e., Jun. 14, 2010) that final cash settlement occurs and the protection seller receives his total $2,000 fee for taking on the credit risk exposure of the credit derivative (see entry 310). At that time (step 210), the agreement for the credit derivative terminates.

On the other hand, a triggering credit event may occur before the expiration date of the credit derivative. The price of the credit derivative may be adjusted upwards due to market forces. Through the mark-to-market process, the updated price effectively results in gains to the protection buyer's account and losses to the protection seller's account. This process (in step 208) may include the clearinghouse (or other appropriate entity/individual) providing/publishing a notice that a triggering event has occurred and will be reflected in the final settlement price of all relevant contracts. Thus, a market participant interested in establishing a position in the futures contract may be aware that the final settlement price will be affected by the previously determined credit events and adjust their valuation of the futures contract.

Unlike a credit derivative corresponding to a single reference entity, a credit derivative product in accordance with aspects of the invention corresponds to a plurality of reference entities. Consequently, such derivative products terminate (in step 210) only if triggering events have occurred for each and every constituent (e.g., reference entity) in the underlying index.

At final settlement, the clearinghouse shall perform the final mark-to-market, with the final settlement price as determined by the sequence of credit events serving as the price for the last mark-to-market. It will be apparent to one skilled in the art that there exist many different formulas for calculating the payout at settlement. The protection seller and protection buyer may be paid (i.e., collect) or be required to pay according to the difference between the updated mark-to-market amount and the market price at final settlement determined by the clearinghouse mark-to-mark on process. With this daily mark-to-market process, the total gain or loss shall be equal to the difference between the price at which the position is established and the final settlement price.

The final settlement price may be determined in many different ways. In one example, the settlement price for a derivative product is the sum total of the product of the assigned weight of each reference entity (i.e., the portion of the total notional amount corresponding to the entity) for which a triggering event has been declared and the predetermined damages recovery rate. For example, a derivative product following the aforementioned settlement technique may be settled on the Final Settlement Date at a value equal to ($\frac{1}{125}$) times $100,000 times 50% (i.e., the assumed damage recovery rate for each constituent) times the number of constituents experiencing a triggering credit event. In such an example, the derivative product may correspond to an index with 125 constituents with a total notional value of $100,000 (i.e., the notional value of the derivative product is the sum of notional values of the identified obligations of each of the constituents) and a 50% damage recovery rate. Thus, if only one constituent experiences a triggering credit event, the final settlement price equals $400. If zero constituents experience a triggering credit event, the final settlement price is zero. Meanwhile, if five constituents experience a triggering credit event, then the final settlement price equals $2,000. Thus, a derivative product in accordance with aspects of the invention may have a digital outcome. In other words, the final settlement price will be applied at a predetermined fixed amount (i.e., a value that is an integer multiple of $400) from $0 to $50,000.

In another example the weight attributed to each reference entity in an index corresponding to a derivative product may vary. For example, although the Dow Jones CDX.NA.IG index equally attributes 0.8% to each of its 125 constituents, the weight attributed to constituents (e.g., the corporate names in a credit derivative product in accordance with aspects of the invention) of another index may be varied. For example, certain constituents may be more heavily weighted than others. The final settlement price applied is, therefore, based on the weight attributed to each constituent in the derivative product. The technique for determining the final settlement price will vary accordingly.

In another example, the final settlement price for a derivative product may be determined using an objectively measured damage recovery rate. For example, the damage recovery rate may vary according to the marketplace or other factors. Therefore, the outcome of the derivative at settlement may not be digital. Rather, for an equally weighted collection of 100 reference entities, the settlement price may be the sum total of the product of the current damage recovery rate for each entity for which a triggering event occurred prior to termination times ($\frac{1}{100}$) the notional value of the derivative product. Thus, if the notional value is $100K, the final settlement price may be various values from $0 to $100K depending on the value of the damage recovery rate at the time. In various examples, the value of the damage recovery rate use may be the value at the time of the triggering event or the value at the time of final settlement.

In another example, the final settlement price may be determined by applying a combination of one or more of the aforementioned settlement techniques. For example, any now known or later developed techniques or processes for determining or identifying the payout at settlement may be used. In one example, the final settlement price may be calculated to accomplish what is known as the first loss piece (e.g., 0-3%) of a portfolio and/or a second loss piece (e.g., 3%-10%) of a portfolio. The settlement value for the first loss piece may be determined by the outcome of MIN(X/0.03, notional value), where 'X' is an intermediate value determined during one of the other aforementioned settlement techniques. In addition, the settlement value for the second loss piece may be determined by the outcome of MIN(MAX(X/0.10-0.03, 0), notional value), where 'X' is again an intermediate value determined during one of the other aforementioned settlement techniques. One skilled in the art will appreciate that "MIN" and "MAX" refer to the minimum and maximum mathematical functions. One skilled in the art will also appreciate that many other techniques exist for determining a final settlement price that may be used in accordance with aspects of the invention (e.g., the loss piece may be a different percentage range).

In accordance with aspects of the invention, in step 210, an agreement for a derivative product with a plurality of constituents (e.g., more than one obligation) may terminate upon the occurrence of the earlier of: (1) the expiration date of the agreement, or (2) an occurrence of a predetermined triggering event for each and every, or substantially every (i.e., the derivative product may indicate that final settlement and termination may occur if a certain percentage or certain entities corresponding to the derivative product experience triggering events), constituent in the derivative product. In a derivative product referencing an index having a large number of constituents the agreement will almost always terminate at the expiration date because, for practical purposes, there is a low probability that each and every constituent will experience a triggering event (e.g., bankruptcy) within the timeframe between the effective date and expiration date of the agreement. For example, the XYZ credit derivative may trigger final settlement by the occurrence of a credit event (e.g., bankruptcy, failure to pay, etc.) associated with each obligation issued by each of the entities in the index, e.g., each and every of the 125 corporate names in an index declare bankruptcy.

The damage recovery rate of a credit derivative corresponds to the amount the protection seller expects to recover in the event of an occurrence of a predetermined credit event. Typically, recovery rate means the recovery of assets by the debt holder (e.g., if a debit is defaulted upon, the recovery rate is 40% if upon liquidating the assets only 40 cents on the dollar are recovered.) Upon the occurrence of a predetermined credit event, the final settlement price may be fixed at a predetermined amount/percentage, and both buyer and seller may be marked-to-market to that amount. The predetermined amount/percentage may, for example, be sixty percent of the notional value of the credit derivative. In that example, the sixty percent is the damage recovery rate of the credit derivative. Alternatively, the credit derivative product may be configured with a variable damage recovery rate of the credit derivative to be calculated at the occurrence of a triggering event. For example, the damage recovery rate may be set (i.e., objectively measured) at the difference between the par value and the market price of a defaulted debt instrument of the reference entity.

For example, the timeline of the credit derivative illustrated in FIG. 4 shows that credit event are declared for fifty entities on Sep. 11, 2008 (see entry 406). Assuming the XYZ credit derivative corresponds to one hundred entities, fifty of those hundred entities declaring, e.g., bankruptcy, may cause a drastic change in the credit derivative. After the declaration of the credit event, a portion of the final settlement price is applied to the agreement. The mark-to-market process results in the market price for the credit derivative drastically changing due to changes in the expected final settlement value due to the notice of recent triggering credit events. In the illustrative credit derivative of FIG. 4, the final cash settlement occurs 5 years after the date of initial purchase (i.e., Jun. 19, 2011). In this example, the credit derivative has an assumed fixed damage recovery rate of 50% and corresponds to a credit index of one hundred entities. Therefore, the maximum final settlement price is established at 50% of the $100,000 notional value of the instrument if all one hundred entities experience triggering credit events. In addition, in one embodiment in accordance with aspects of the invention, the protection buyer's recovery is reduced by the initial fee of the credit derivative. In the example depicted in FIG. 4, the protection buyer collected (see entry 408) an aggregated total of $23,000 (received through the accumulated daily mark-to-market process) because his recovery of $25,000 is reduced by the 200 basis points he owed for purchasing the credit derivative. Notice that by the time the agreement terminates in step 210, the protection buyer has already effectively received from the protection seller the entire (or almost the entire) $23,000 through the mark-to-market process over the duration of the derivative product. Notably, much of the $23,000 is received immediately on and after Sep. 11, 2008 when fifty of the entities corresponding to the XYZ credit derivative experienced triggering credit events. Thus, the MTM process updates the market price of the derivative product accordingly.

In accordance with aspects of the invention, examples of predetermined triggering credit events include, but are not limited to, bankruptcy, obligation acceleration, obligation default, failure to pay, debt repudiation, moratorium, and restructuring. Other examples and descriptions of credit events may be found in by one skilled in the art in the 2003 International Swaps & Derivatives Association (ISDA) Credit Derivative Definitions booklet, which is incorporated by reference in its entirety. For example, a "bankruptcy" event may imply that the reference entity for the credit derivative has become insolvent or lacks the financial capacity to meet its debt obligations. A "failure to pay" event may imply that the reference entity for the credit derivative simply fails to make a scheduled interest or principal payment. A "debt restructuring" event includes a scenario where the seniority of a payment due to the holder of the reference entity has been degraded. An "obligation default or acceleration" event may occur when a debt covenant(s) for the reference entity has been violated, thereby making the debt obligation come due prior to the original maturity date. A "debt payment moratorium" event may arise when the reference entity refuses to make scheduled debt service payments.

In addition, one skilled in the art after a thorough review of the teachings disclosed herein will appreciate that examples have been provided for credit derivatives, the invention is not so limited. The invention may be implemented to enable exchange-trade derivatives of any type regarding any subject matter. In one example, triggering events may include an outcome or range of outcomes for an economic or agricultural report and/or factor (e.g., if the November release of non-farm payrolls exceeds 200,000 jobs before an expiration date, then a final settlement may be triggered). In yet another example, a price or range of prices for a financial instrument, security or commodity may act as triggering events for derivatives in accordance with aspects of the invention (e.g., if Japanese yen futures close above a certain price at any point prior to an expiration date, then a final settlement may be triggered). In another example, triggering events may be based on weather events and/or reporting including, but not limited to, temperature, precipitation, and/or windspeed (e.g., if the windspeed measured at Miami airport exceeds 90 miles per hour before the expiration date, then a final settlement may be triggered). In one example, derivatives may be exchange-traded that correspond to the risk of a hurricane event occurring during a certain period of time. In yet another example, triggering events may be aligned with indexes, such as a housing index, a commercial real estate index, and others. One skilled in the art will appreciate after thorough review of the teachings disclosed herein that numerous other indexes and/or factors may be used for triggering events.

Furthermore, derivative products may, in accordance with the aspects of the invention, be based on weather events (e.g., wind speed, rain fall, snow fall, catastrophic weather events, days with temperatures above or below a threshold, days with sunshine below a threshold, etc.), environmental conditions, interest rates (e.g., Fed Reserve raising interest rates), and other types of events/occurrences/etc. For example, a derivative product with a notional value of $1,000 may be provided that settles upon the occurrence of a wind speeds over 100 miles per hour in all the cities of New Orleans, Miami, and Orlando between the effective date and expiration date of the agreement. As explained earlier, if wind speeds exceed 100 miles per hour in only one of the three constituents (e.g., in this case, cities), the final settlement price at expiration of the derivative may be one-third the notional value of $1,000. At least one benefit of this arrangement is the broader range of coverage provided by the derivative product.

Figure 5:
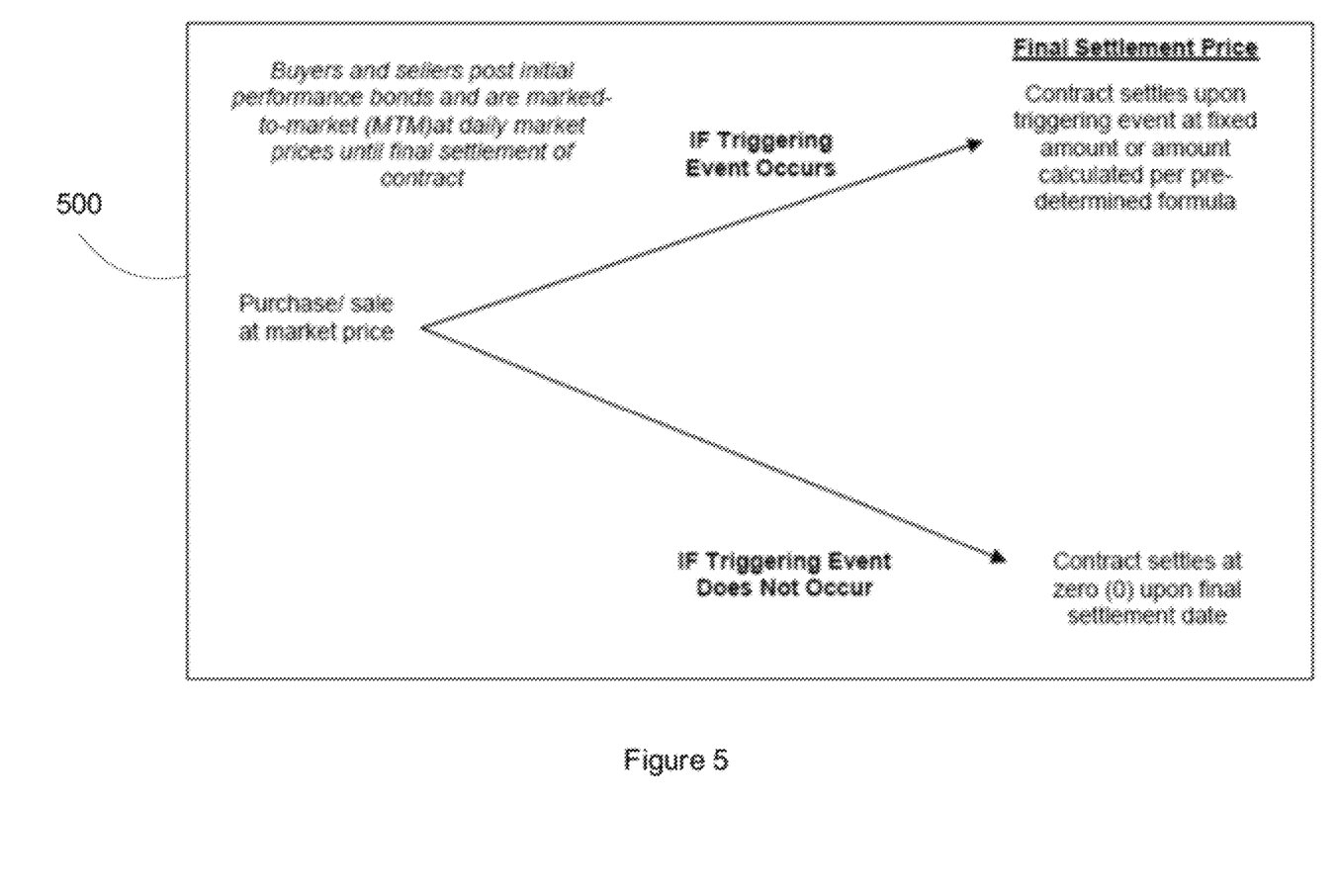
FIG. 5 illustrates a binary outcome derivative product with a futures-style bookkeeping treatment.

FIG. 5 illustrates a derivative product with possible binary outcomes 500. A buyer may purchase a derivative configured with a binary outcome and having a final settlement based on a triggering event. The triggering event may be based on any of a number of things. In addition, the triggering event may be based on a combination of things (e.g., windspeed at Miami airport and precipitation). If the triggering event occurs, the derivative settles at a final settlement price. If the triggering event does not occur, the derivative settles at zero upon the final settlement date (i.e., upon expiration). A derivative with a binary outcome may use futures-style bookkeeping techniques.

Figure 6:
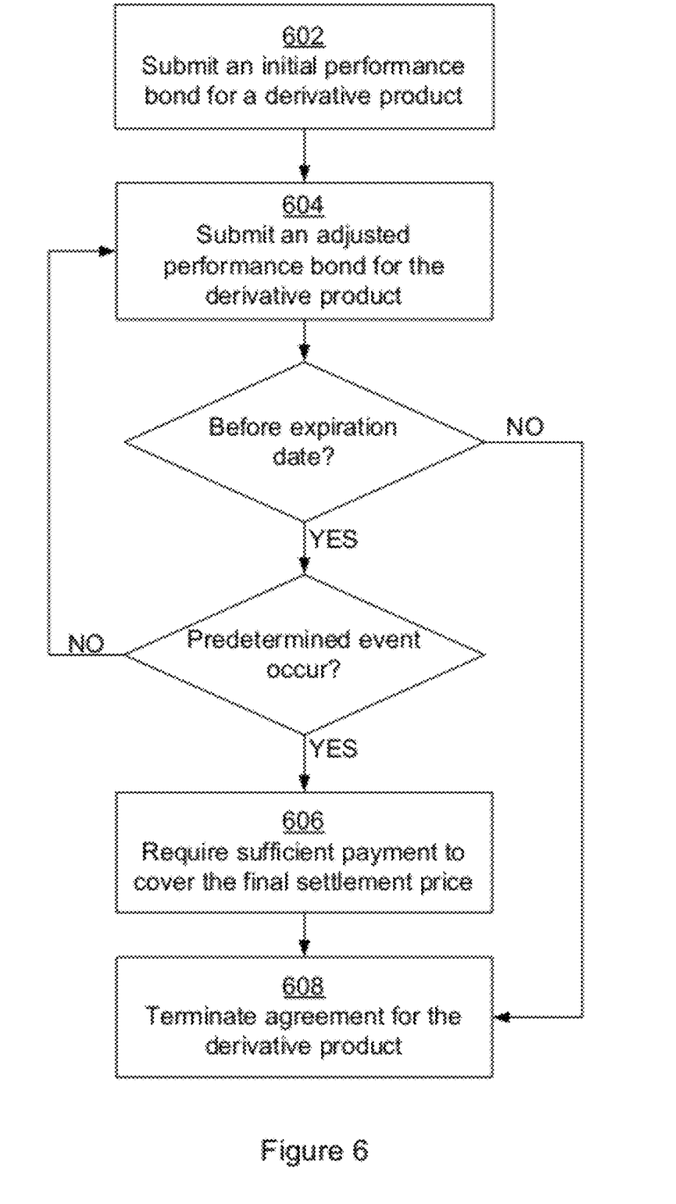
FIG. 6 illustrates a method for transacting derivative products using a computer system in accordance with aspects of the invention.

FIG. 6 illustrates a method for purchasing an exchange traded derivative product using a computer system. The exchange traded derivative product may be a credit default swap in one embodiment. In step 602, a customer, trader, or other user may submit an initial performance bond for the derivative product. The bond may be received (e.g., receive account number and process) by a computer system that processes and clears an agreement for the derivative product. The computer system may update the price of the derivative product at an interval through a mark-to-market process, and as appropriate, may change the margin requirements for the derivative products. The user may then submit (in step 604) an adjusted performance bond for the derivative product for receipt by the computer system. As the market price of the derivative product changes (e.g., if a predetermined triggering event occurs before an expiration date), the user may be required to submit (in step 606) sufficient payments to cover the final settlement price of the derivative product. In an example where the derivative product comprises a plurality of constituents, the user may be required to submit (in step 606) sufficient payments to cover an appropriate percentage of the final settlement price of the derivative product. As described above, the appropriate percentage may be directly related to the weight attributed to the constituent relative to the total derivative product. If no predetermined triggering event occurs before the expiration date, then the agreement may be terminated (in step 608) at a zero final settlement price. One skilled in the art will appreciate that many different users and types of users may interact with a computer system in accordance with aspects of the invention described above.

Figure 7:
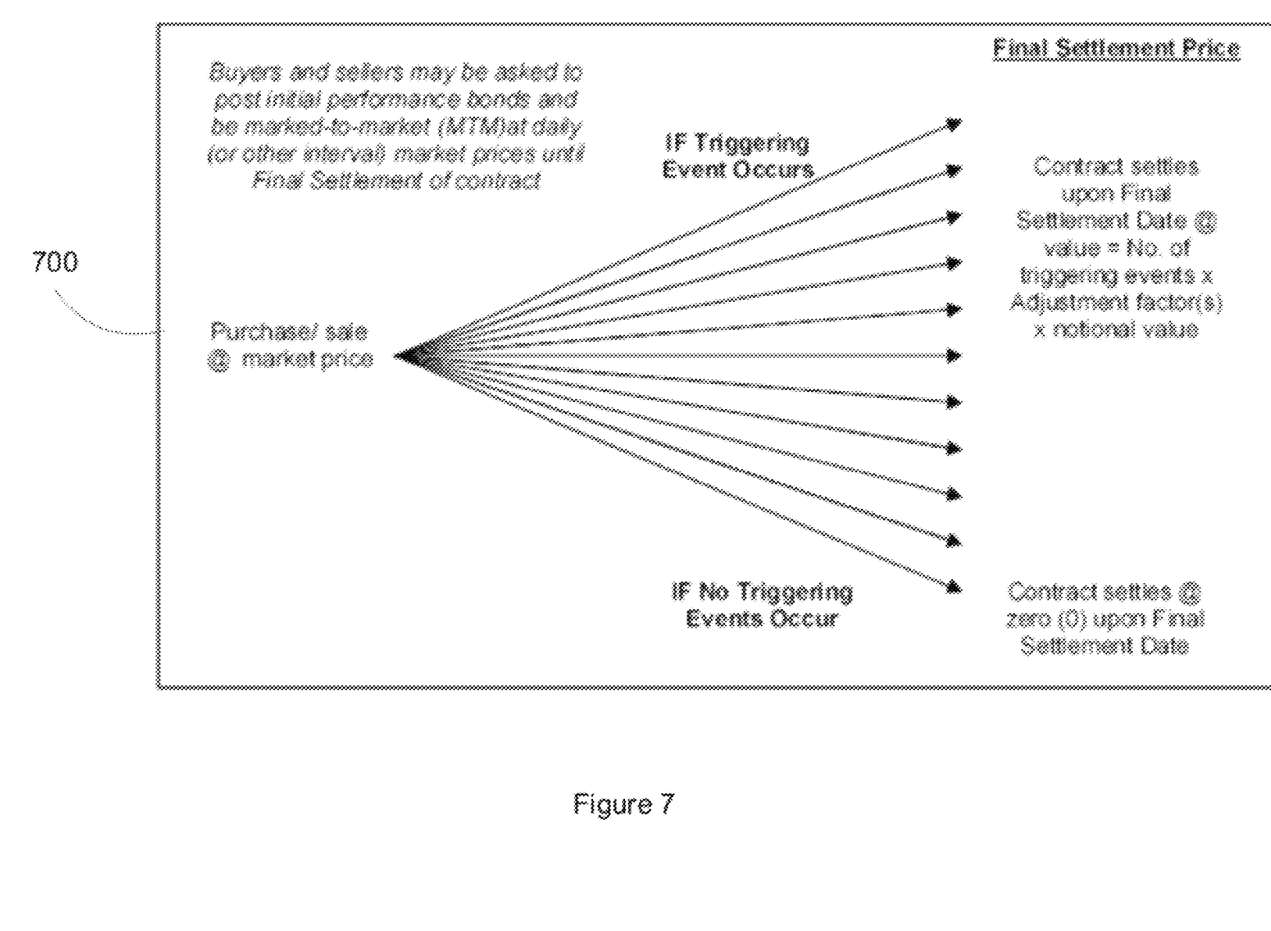
FIG. 7 illustrates a digital outcome derivative product with a futures-style bookkeeping treatment.

FIG. 7 illustrates the digital outcomes 700 possible with a derivative product in accordance with aspects of the invention. A protection buyer may purchase a derivative product configured with a digital outcome and comprising a plurality of constituents. At the settlement date (or earlier if appropriate) the agreement for the derivative product is settled based on the number of constituents that experienced triggering events. In accordance with aspects of the invention, derivative products or futures contracts settle to a settlement price determined by the occurrence of a sequent of events. As explained above, the triggering event may be based on any of a number of things. This sequence of events may be, among other things, credit events (e.g., ISDA defined credit events, or any other credit events) on a predetermined collection of underlying constituents, weather events, interest rate events, etc. In addition, the triggering event may be based on a combination of things (e.g., windspeed at Miami airport and precipitation). If no triggering events occur for any of the constituents, the derivative settles at zero upon the final settlement date (i.e., upon expiration).

Further referring to FIG. 7, a derivative with a digital outcome in accordance with aspects of the invention may use futures-style bookkeeping techniques. For example, to maintain compatibility with futures bookkeeping practices, among other things, derivative products in accordance with aspects of the invention may be quoted in terms of the total remaining value of the protection (e.g., credit protection). Therefore, a derivative product with a 5-year term quoted as 250 bps implies an annualized quote of approximately 50 bps. Daily mark-to-market procedures may be used to ensure that the value of credit protection is transferred from protection buyer to protection seller as the agreement approaches expiration in the absence of a triggering event, and that the value of any accumulated payments through the mark-to-market process are transferred from seller to buyer.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

We claim:

1. An apparatus for trading an exchange traded derivative product using an exchange computer system, comprising:
   a processing unit;
   an interface comprising at least one of an input device, output device, and network interface; and
   a memory unit storing computer-executable instructions, which when executed by the processing unit, cause the computer system to perform a method comprising:
      receiving, through the interface of the exchange computer system, an initial performance bond of a protection buyer of the derivative product, wherein the derivative product has a digital outcome and comprises a predetermined number of constituents;
      updating, by the processing unit, a price of the derivative product through a mark-to-market process, including transferring at an interval a cash flow between the protection buyer and a protection seller based on the price of the derivative product;
      adjusting, by the processing unit, the cash flow including a part of a total fee for the derivative product based on the price of the derivative product such that the fee component of the cash flow of a first interval, a second interval, and a third interval are each different; and
      for each of the predetermined number of constituents that experience a predetermined triggering event before an expiration date, applying, by the processing unit, a percentage of a final settlement price of the derivative product.

2. The apparatus of claim 1, wherein the memory unit further stores computer-executable instructions, which when executed by the processing unit, cause the computer system to perform a method comprising:
   terminating the derivative product at the earlier of: the expiration date of the derivative product, or an occurrence of the predetermined triggering event for all constituents in the derivative product.

3. The apparatus of claim 1, wherein the percentage of the final settlement price applied is based on weight attributed to each constituent in the derivative product.

4. The apparatus of claim 1, wherein the initial performance bond price is less than the final settlement price.

5. The apparatus of claim 1, wherein the final settlement price of the derivative product is determined based on a predetermined fixed amount that is a percentage of a notional value of the derivative product, wherein the notional value of the derivative product is the sum of notional values of obligations of each of the predetermined number of constituents.

6. The apparatus of claim 1, wherein the final settlement price of the derivative product is determined based on a variable amount calculated using a predetermined formula with a variable damage recovery rate.

7. The apparatus of claim 1, wherein the price of the derivative product is based on a total remaining time until expiration of the derivative product, wherein the updating the price of the derivative product is performed daily through a mark-to-market process, and wherein the price of the derivative product is zero at a time of expiration of the derivative product.

8. The apparatus of claim 1, wherein the predetermined triggering event is a credit event based on at least one of the following: bankruptcy, obligation acceleration, obligation default, failure to pay, debt repudiation, moratorium, and restructuring.

9. The apparatus of claim 1, wherein the predetermined triggering event is a weather event based on at least one of the following: temperature, precipitation, and windspeed.

10. The apparatus of claim 1, wherein the predetermined triggering event is based on at least one of the following: economic factor, agricultural factor, financial instruments, security, commodity, housing index, and real estate index.

11. The apparatus of claim 1, wherein the derivative product is a credit default swap, and a clearinghouse acts as a guarantor of the derivative product.

12. The apparatus of claim 1, wherein the derivative product is based on a single reference entity.

13. The apparatus of claim 1, wherein the derivative product is a credit default option, and a clearinghouse acts as a guarantor of the derivative product.

14. The apparatus of claim 1, wherein the memory unit further stores computer-executable instructions, which when executed by the processing unit, cause the computer system to perform a method comprising:
receiving a second initial performance bond of a protection seller of the derivative product.

15. A non-transitory computer-readable medium storing computer-executable instructions configured to cause a computer executing the computer-executable instructions to perform a method comprising:
receiving an initial performance bond of a protection buyer of a derivative product, wherein the derivative product has a digital outcome and comprises a predetermined number of constituents;
receiving an adjusted performance bond of a protection buyer of the derivative product;
updating a price of the derivative product at an interval through a mark-to-market process;
transferring a cash flow between the protection buyer and a protection seller based on the price of the derivative product;
adjusting the cash flow including a part of a total fee for the derivative product based on the price of the derivative product such that the fee component of the cash flow of a first interval, a second interval, and a third interval are each different, wherein a total fee for the derivative product is not received until an expiration date of the derivative product; and
for each of the predetermined number of constituents that experience a predetermined triggering event before the expiration date, requiring sufficient funds to cover a percentage of a final settlement price of the derivative product.

16. The non-transitory computer-readable medium of claim 15, further storing computer-executable instructions configured to cause the computer to perform a method comprising:
terminating the derivative product at the earlier of: the expiration date, or an occurrence of the predetermined triggering event for all constituents in the derivative product, wherein the derivative product is a credit default swap with 125 constituents.

17. The non-transitory computer-readable medium of claim 15, wherein the final settlement of the derivative product is based on a variable amount calculated using a predetermined formula with a variable damage recovery rate.

18. A method comprising:
receiving an initial performance bond for an exchange-traded derivative product by an exchange computer system that processes and clears an agreement for the derivative product, wherein the derivative product has a digital outcome and a price, and wherein the computer system updates the price of the derivative product at an interval through a mark-to-market process, including transferring a cash flow between a protection buyer of the derivative product and a protection seller of the derivative product based on the price of the derivative product;
adjusting, by a processor of the computer system, the cash flow including a part of a total fee for the derivative product based on the price of the derivative product such that the fee component of the cash flow of a first interval, a second interval, and a third interval are each different; and
performing one of the following:
if a predetermined triggering event occurs for any of a predetermined number of constituents before an expiration date, then requiring, by the computer system, sufficient payment to cover an appropriate percentage of the final settlement price of the derivative product, and
if no predetermined triggering event occurs before the expiration date, then terminating, by the computer system, the agreement at a zero final settlement price.

19. The method of claim 18, further comprising:
receiving, using the computer system, an adjusted performance bond for the derivative product.

20. The method of claim 18, wherein the exchanged traded derivative product is a credit default swap with a predetermined number of constituents.

* * * * *